US012722634B2

(12) United States Patent
Mukai et al.

(10) Patent No.: US 12,722,634 B2
(45) Date of Patent: Sep. 1, 2026

(54) VEHICLE CONTROL DEVICE AND VEHICLE CONTROL METHOD FOR CONTROLLING SPEED ACCORDING TO LIGHTING STATE OF TRAFFIC LIGHT

(71) Applicants: DENSO CORPORATION, Kariya-city (JP); TOYOTA JIDOSHA KABUSHIKI KAISHA, Toyota (JP)

(72) Inventors: Yasuhiko Mukai, Tokyo (JP); Tomohito Terazawa, Tokyo (JP); Genki Kitahara, Tokyo (JP); Norihiro Kurose, Tokyo (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 218 days.

(21) Appl. No.: 18/597,708

(22) Filed: Mar. 6, 2024

(65) Prior Publication Data

US 2024/0208500 A1 Jun. 27, 2024

Related U.S. Application Data

(63) Continuation of application No. PCT/JP2022/032097, filed on Aug. 25, 2022.

(30) Foreign Application Priority Data

Sep. 9, 2021 (JP) ................................ 2021-146929

(51) Int. Cl.
*G06V 20/58* (2022.01)
*B60W 30/14* (2006.01)
*B60W 30/18* (2012.01)
*G06T 7/70* (2017.01)

(52) U.S. Cl.
CPC .... *B60W 30/143* (2013.01); *B60W 30/18154* (2013.01); *B60W 30/18159* (2020.02); *G06T 7/70* (2017.01); *G06V 20/584* (2022.01); *B60W 2420/403* (2013.01); *B60W 2555/60* (2020.02); *B60W 2556/40* (2020.02); *G06T 2207/30252* (2013.01)

(58) Field of Classification Search
CPC .......... B60W 30/18154; B60W 30/143; G06V 20/584; G06V 20/582; G08G 1/095
See application file for complete search history.

(56) References Cited

U.S. PATENT DOCUMENTS

2018/0154870 A1* 6/2018 Kurata ...................... B60T 7/12
2018/0281802 A1* 10/2018 Oyama ........... B60W 30/18154
2019/0302789 A1* 10/2019 Miura ............. B60W 30/18159
2021/0129841 A1* 5/2021 Ikezawa .............. B60W 30/182

* cited by examiner

*Primary Examiner* — Kenneth J Malkowski
(74) *Attorney, Agent, or Firm* — Precision Patents, P.C.

(57) ABSTRACT

By a vehicle control device or a vehicle control method for controlling a speed of a vehicle, a lighting state of a main light of a traffic light and a travel permission direction of an arrow light of the traffic light is recognized, and stop deceleration control that starts deceleration control executed for stop at a stop line and primary deceleration control that decelerates the vehicle at a deceleration rate slower than a deceleration rate by the stop deceleration control are executed.

10 Claims, 15 Drawing Sheets

5
11
10
20
21
CAMERA
22
Lidar
PERIPHERY DETECTION SENSOR
30
POSITION DETECTION UNIT
40
VEHICLE SPEED SENSOR
50
MAP DB
70
71
SIGNAL RECOGNITION UNIT
72
TRAVEL LANE RECOGNITION UNIT
73
TRAVEL CONTROLLER
VEHICLE CONTROL ECU
60
ACTUATOR START
S1
LIGHTING COLOR OF MAIN LIGHT RECOGNIZED?
NO
S2
CONTROL TRAVEL ALONG ROAD
YES
S3
RED LIGHT LIT?
NO
S4
DO CONTROL ACCORDING TO LIT LIGHT COLOR
YES
S7
ARROW LIGHT STATE RECOGNIZED?
NO
YES
S9
PASSING POSSIBLE LIGHT?
YES
NO
S8
DO PRIMARY DECELERATION CONTROL
S10
DO STOP DECELERATION CONTROL
S11
DO PASSING SPEED CONTROL
END
END

VEHICLE CONTROL DEVICE AND VEHICLE CONTROL METHOD FOR CONTROLLING SPEED ACCORDING TO LIGHTING STATE OF TRAFFIC LIGHT

CROSS REFERENCE TO RELATED APPLICATIONS

The present application is a continuation application of International Patent Application No. PCT/JP2022/032097 filed on Aug. 25, 2022, which designated the U.S. and claims the benefit of priority from Japanese Patent Application No. 2021-146929 filed on Sep. 9, 2021. The entire disclosures of all of the above applications are incorporated herein by reference.

TECHNICAL FIELD

The present disclosure relates to a vehicle control device and a vehicle control method, and particularly relates to a technology for controlling speed according to a lighting state of a traffic light.

BACKGROUND

In a comparative example, a driving assistance device can advance an assistance timing and reduce an inconvenience on an occupant in the driving assistance based on a recognition result of an arrow traffic light. This driving assistance device executes first assistance control as deceleration control when it can recognize the lighting of a red light but cannot recognize the lighting of an arrow signal. Further, when this driving assistance device can recognize the lighting of the red light and the lighting of the arrow signal but cannot recognize a direction of the arrow signal, it executes second assistance control that decelerates a vehicle at a lower deceleration rate than the first assistance control.

By executing the second assistance control, it is possible to recognize the direction of the arrow signal, and reduce changes in acceleration when it is determined that the deceleration control is unnecessary. According, it is possible to prevent the inconvenience form being provided to the occupant.

SUMMARY

By a vehicle control device or a vehicle control method for controlling a speed of a vehicle, a lighting state of a main light of a traffic light and a travel permission direction of an arrow light of the traffic light is recognized, and stop deceleration control that starts deceleration control executed for stop at a stop line and primary deceleration control that decelerates the vehicle at a deceleration rate slower than a deceleration rate by the stop deceleration control are executed.

DETAILED DESCRIPTION

Figure 1:
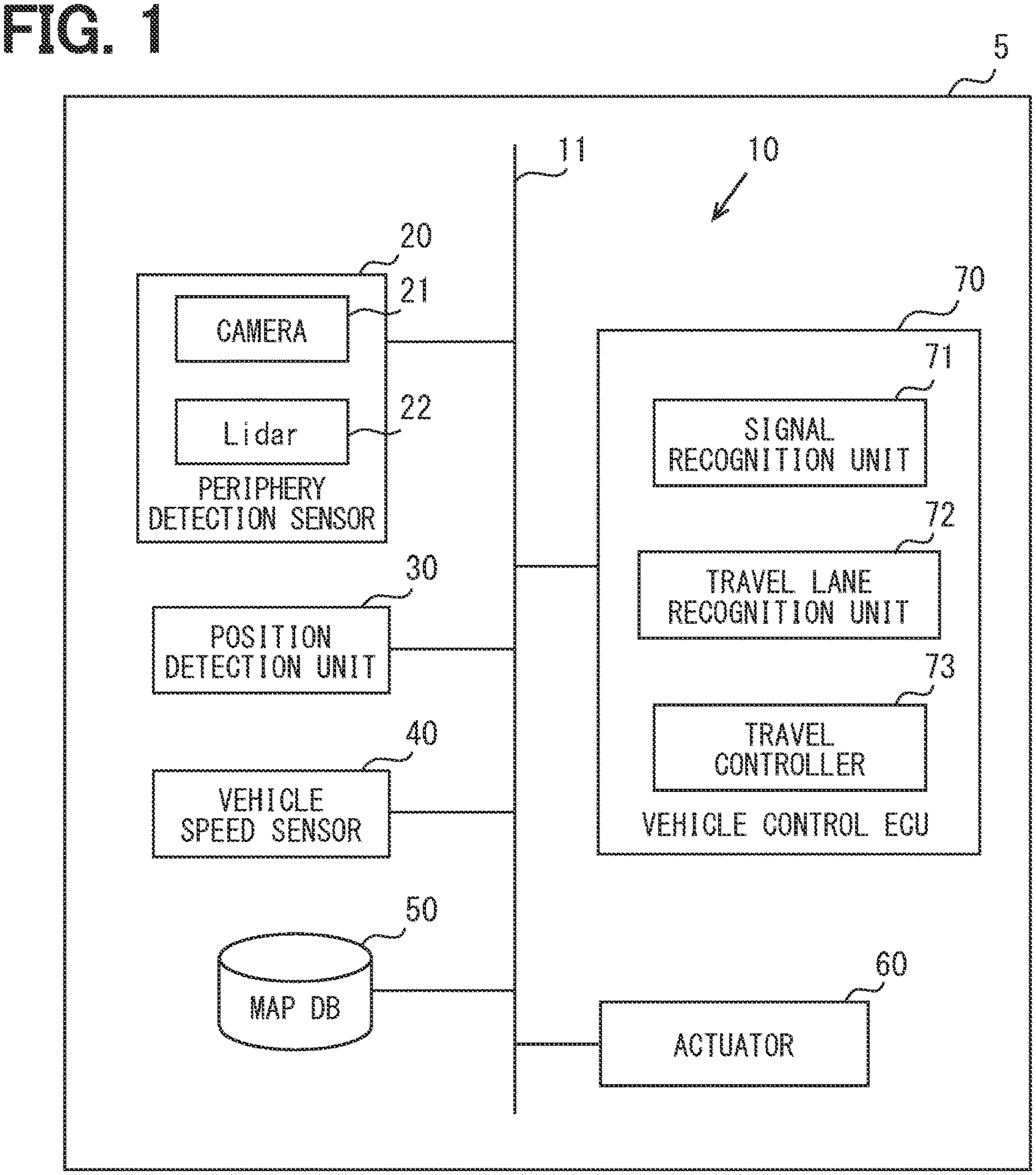
FIG. 1 is a diagram showing a configuration of a vehicle control device.

A position where the light (hereinafter referred to as arrow light) of the arrow signal can be recognized is likely to be closer to the traffic light than a position where the main light can be recognized. Therefore, the second assistance control is likely to be executed at a later time than when it is recognized that the main light is red, although it cannot be recognized whether the arrow light is on. When the start of the second assistance control is delayed, the deceleration rate may be required to increase in order to be able to stop at a stop line. When the deceleration of the second assistance control becomes large, the change in acceleration is likely to become large when the deceleration control is unnecessary. As a result, it becomes difficult to prevent the inconvenience from being provided to the occupant.

One example of the present disclosure provides a vehicle control device and a vehicle control method capable of starting deceleration at an early timing while preventing an occupant from feeling uncomfortable when a red light is turned on.

One example embodiment of the present disclosure provides a vehicle control device for controlling a speed of a vehicle. The device includes: a signal recognition unit configured to recognize a lighting state of a main light of a traffic light and a travel permission direction of an arrow light of the traffic light based on an image obtained by a camera that recognizes a periphery environment of the vehicle; and a travel controller configured to execute: stop deceleration control that starts deceleration control executed for stop at a stop line from a stop deceleration start position when determining that a red light, which is one of the main light, has been lit from a recognition result of the signal recognition unit; and primary deceleration control that decelerates the vehicle at a deceleration rate slower than a deceleration rate by the stop deceleration control from a position farther from the stop line than the stop deceleration start position when a primary control condition is satisfied. The primary control condition is satisfied when, based on the recognition result of the signal recognition unit, the travel controller determines that the red light has been lit and does not determine whether the arrow light has been lit.

Another example embodiment of the present disclosure provides a vehicle control method for controlling a speed of a vehicle. The method includes: recognizing a lighting state of a main light of a traffic light and a travel permission direction of an arrow light of the traffic light based on an image obtained by a camera that recognizes a periphery environment of the vehicle; and executing: stop deceleration control that starts deceleration control executed for stop at a stop line from a stop deceleration start position when determining that a red light, which is one of the main light, has been lit from a recognition result; and primary deceleration control that decelerates the vehicle at a deceleration rate slower than a deceleration rate by the stop deceleration control from a position farther from the stop line than the stop deceleration start position when a primary control condition is satisfied. The primary control condition is satisfied when, based on the recognition result, it is determined that the red light has been lit and does not determine whether the arrow light has been lit.

According to this vehicle control device and vehicle control method, the primary deceleration control, which is slower deceleration than the stop deceleration, is started from a position farther from the stop line than the stop deceleration start position. One primary control condition, which is the condition for starting the primary deceleration control, is satisfied when it can be determined that the red light has been lit, but it cannot be determined whether the arrow light has been lit.

A position where the main light can be recognized is likely to be more distant from the traffic light than a position where the lighting of the arrow light can be recognized. In the comparative example, the condition for executing the second assistance control is that not only the main light but also the lighting of the arrow light can be recognized. Accordingly, this vehicle control device can often start primary deceleration control earlier than the second assistance control in the comparative example. Therefore, it becomes possible to make the deceleration rate in the primary deceleration control a slower deceleration. Accordingly, it is possible to prevent the occupant from feeling uncomfortable.

First Embodiment

Hereinafter, a first embodiment will be described with reference to the drawings. FIG. 1 is a diagram showing a configuration of a vehicle control device 10. The vehicle control device 10 is mounted on a vehicle 5. Under a condition that the vehicle travels on the road, the vehicle 5 May be any type of vehicle without particular limitation. The vehicle 5 May include a four-wheeled vehicle and a motorcycle.

The vehicle control device 10 is a device that controls the behavior of the vehicle 5. The vehicle control device 10 executes vehicle control corresponding to automated driving level 3. The automated driving level 3 is a vehicle control without periphery monitoring obligation of a driver under certain conditions. The vehicle control device 10 May execute vehicle control corresponding to automated driving levels 2 and 1. In the automated driving levels 2 and 1, the driver always has the periphery monitoring obligation.

The vehicle control device 10 includes a periphery detection sensor 20, a position detection unit 30, a vehicle speed sensor 40, a storage 50, an actuator 60, and a vehicle control ECU 70. These are connected to an in-vehicle LAN 11 and execute communication via the in-vehicle LAN 11.

Figure 2:
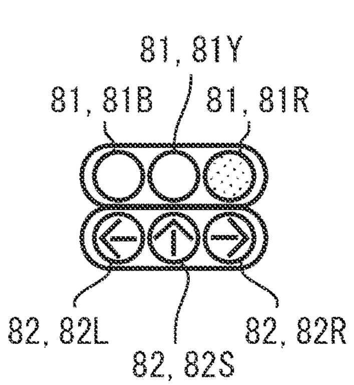
FIG. 2 is a diagram illustrating a traffic light.

The periphery detection sensor 20 is a sensor that detects various objects existing in the periphery of the vehicle 5. The objects also include planar objects such as lane markings. In FIG. 2, a camera 21 and a lidar 22 are shown as the periphery detection sensor 20. The camera 21 captures an image in front of the vehicle 5. Further, the camera 21 May capture the sides and rear of the vehicle 5. The lidar 22 detects an object position in the periphery of the vehicle 5 by projecting and receiving light. Note that in addition to or in place of the Lidar 22, another sensor for detecting objects existing in the periphery of the vehicle 5, such as a millimeter wave radar, may be provided.

The position detection unit 30 sequentially detects the current position of the vehicle 5. The position detection unit 30 includes, for example, a GNSS receiver. The GNSS receiver receives a navigation signal transmitted by a navigation satellite included in the GNSS (Global Navigation Satellite System), which is a satellite navigation system, and sequentially calculates the current position based on the received navigation signal. The position detection unit 30 May include an inertial sensor. The inertial sensor is a sensor that detects inertia generated in the vehicle 5, and includes one or both of an acceleration sensor and an angular velocity sensor. The inertial sensor can sequentially detect changes in the relative position of the vehicle 5.

The vehicle speed sensor 40 sequentially acquires a vehicle speed V, which is the speed of vehicle 5. The storage 50 is writable and stores various information. The storage 50 May be provided by a flash memory. The storage 50 stores a map database (hereinafter referred to as map DB). The map DB includes map information called a high-precision map. The high-precision map is a three-dimensional map, and includes traffic light information about some or all of the traffic lights 80.

FIG. 2 illustrates the traffic light 80. The traffic light 80 shown in FIG. 2 includes a red light 81R, a yellow light 81Y, and a blue light 81B, which are main lights 81, in order from the right. Further, arrow lights 82 are provided below the main lights 81. The arrow light 82 is a light device that indicates the direction in which the vehicle is allowed to travel depending on the direction of the arrow. The traffic light 80 shown in FIG. 2 includes three arrow lights 82. An arrow light 82L is located below the blue light 81B, and is an arrow light 82 that indicates permission to turn left. An arrow light 82S is located below the yellow light 81Y, and is an upward arrow light 82 that indicates permission to proceed straight. An arrow light 82R is located below the red light 81R, and is an arrow light 82 that indicates permission to turn right. The traffic light 80 shown in FIG. 2 includes three arrow lights 82, but some traffic lights 80 include only one or two arrow lights 82. There are also traffic lights 80 that are not equipped with any arrow lights 82.

The traffic light information includes information indicating whether the traffic light 80 is equipped with an arrow light 82, and information indicating, when it is equipped with an arrow light 82, a relationship between the fixed position of the arrow light 82 and the direction (that is, travel permission direction) of the arrow indicated by the arrow light 82. The fixed position of the arrow light 82 is a fixed position with respect to the main light 81. The fixed position of the arrow light 82 can be indicated by which main light 81 it is over.

The map DB includes information indicating the number of lanes and the travel permission direction (hereinafter referred to as a lane travel permission direction) at the intersection of each lane for at least some roads. The information indicating the lane travel permission direction may be included in the high-precision map, or may be included in a less-precision map used for route guidance during manual driving.

The actuator 60 is an actuator that causes the vehicle 5 to travel and stop, and also controls the travel direction of the vehicle 5.

The vehicle control ECU 70 executes automated driving control corresponding to automated driving level 3. Further, the vehicle control ECU 70 May execute automated driving control corresponding to automated driving level 2 or 1.

The vehicle control ECU 70 can be implemented by a configuration including at least one processor. For example, the vehicle control ECU 70 May be implemented by a computer including a processor, a non-volatile memory, a RAM, an I/O, and a bus line connecting these components. The non-volatile memory stores a program that operates a general-purpose computer as the vehicle control ECU 70. The processor executes the vehicle control program stored in the non-volatile memory while utilizing the temporary storage function of the RAM, so that the vehicle control ECU 70 operates as a signal recognition unit 71, a travel lane recognition unit 72, and a travel controller 73. Execution of these operations indicates execution of a vehicle control method corresponding to the vehicle control program. The signal recognition unit 71, the travel lane recognition unit 72, and the travel controller 73 are functions that are executed at least when the vehicle control ECU 70 executes automated driving control corresponding to automated driving level 3.

The signal recognition unit 71 sequentially recognizes the lighting state of the main light 81 of the traffic light 80 and the travel permission direction indicated by the arrow light 82 of the traffic light 80 based on the image captured by the camera 21. Specifically, the signal recognition unit 71 executes the following process. The signal recognition unit 71 analyzes the image captured by the camera 21 and detects the traffic light 80 that the vehicle 5 should follow next. The traffic light 80 that the vehicle 5 should follow next is hereinafter referred to as a target traffic light. Next, the signal recognition unit 71 determines the color of the light lit in the main light 81 of the target traffic light. Further, the signal recognition unit 71 determines whether the arrow light 82 is present in the traffic light 80.

Further, when it is determined that the arrow light 82 is present, the signal recognition unit 71 determines the arrow light 82 that is lit. Even when the traffic light 80 is equipped with one or more arrow lights 82, none of the arrow lights 82 May be lit depending on the time. Furthermore, the signal recognition unit 71 can also analyze the image captured by the camera 21 and determine the direction of the arrow of the arrow light 82 that is lit.

However, in the present embodiment, since the traffic light information can be acquired from the map DB, it is not necessary to be able to recognize the direction of the arrow by image analysis as long as the position where the lit arrow light 82 is fixed can be specified. When the fixed position of the lit arrow light 82 can be specified, the direction of the arrow of the lit arrow light 82 can be determined based on the traffic light information. By being able to specify the direction of the arrow of the lit arrow light 82, it is possible to recognize the travel permission direction indicated by the arrow light 82.

The travel lane recognition unit 72 sequentially recognizes which lane the vehicle 5 is traveling in. Further, the travel lane recognition unit 72 determines, in the lane in which the vehicle 5 is traveling, the travel permission direction at the target intersection. The target intersection is an intersection where traffic is regulated by target traffic light. The travel lane recognition unit 72 can analyze the image captured by the camera 21 and recognize the lane in which the vehicle 5 is traveling. Further, the travel lane recognition unit 72 May recognize the lane in which the vehicle 5 is traveling using information detected by other periphery detection sensors 20 such as Lidar 22.

The travel lane recognition unit 72 can determine the travel permission direction at the intersection in the lane in which the vehicle 5 is traveling based on the lane in which the vehicle 5 is traveling and the travel permission direction of the lane stored in the map DB. Further, by recognizing the shape of a road marking 90 (see FIG. 5 and the like) indicating the travel direction, it is possible to determine the travel permission direction in which the lane in which the vehicle 5 is traveling.

Figure 3:
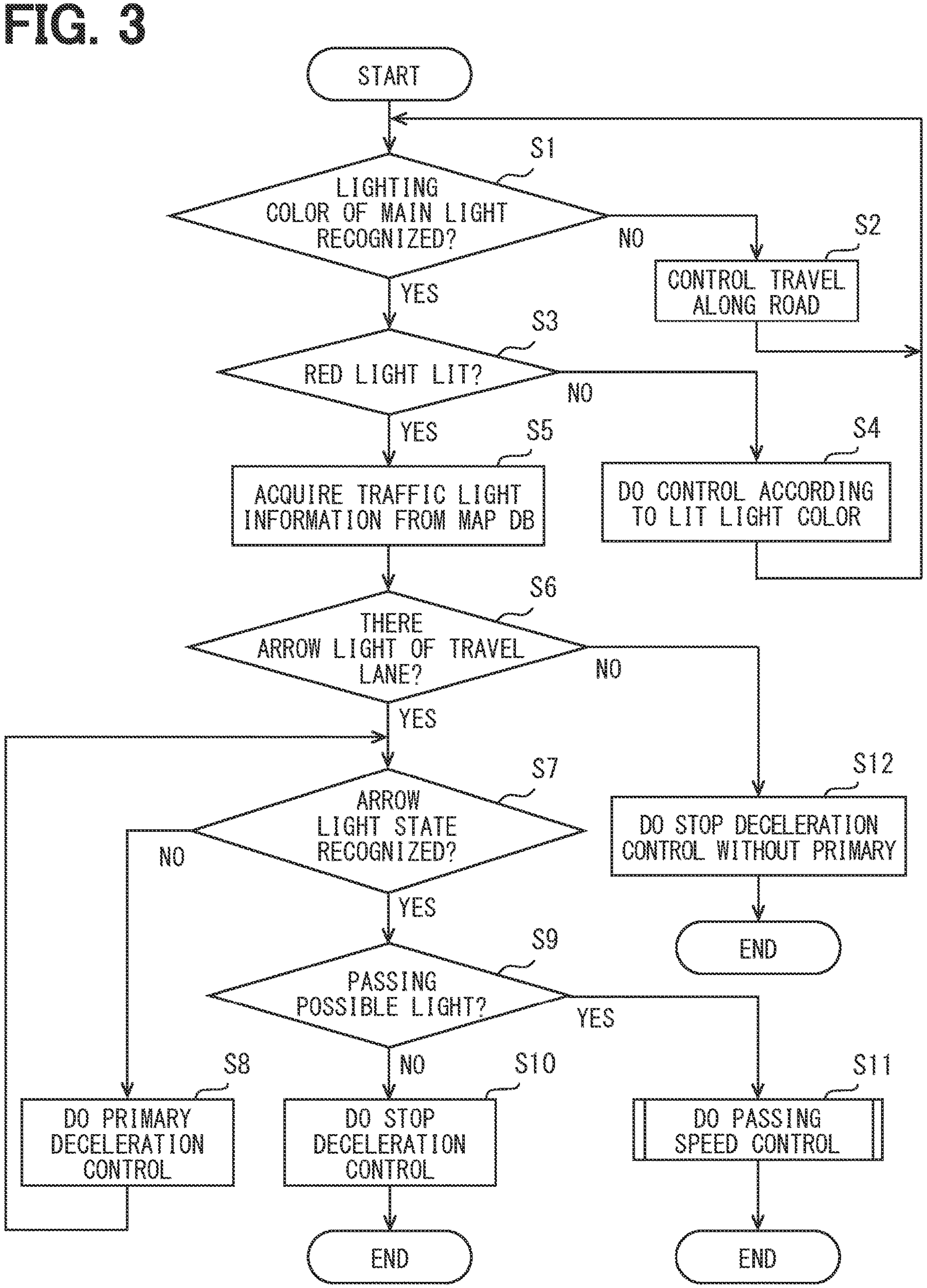
FIG. 3 is a diagram showing a process executed by a travel controller according to a first embodiment.

The travel controller 73 controls the vehicle speed V. In addition, the travel controller 73 May control the travel direction of the vehicle 5. The vehicle speed V controlled by the travel controller 73 will be described in detail. FIG. 3 shows a process executed by the travel controller 73. The travel controller 73 periodically executes the process shown in FIG. 3.

In S1, the signal recognition unit 71 determines whether it has recognized which main light 81 of the target traffic light has been lit. When the distance to the target traffic light is long, it cannot be determined which main light 81 is lit. The distance from the vehicle 5 to the target traffic light when the lit main light 81 can be recognized also depends on the weather, vehicle speed, performance of the camera 21, and the like. The distance from the vehicle 5 to the target traffic light when the lit main light 81 can be recognized is, for example, a little less than 100 meters. When the determination result in S1 is NO, the vehicle 5 is relatively far from the target intersection.

Therefore, when the determination result in S1 is NO, the process proceeds to S2 and road control is executed. The road control is control in which the vehicle 5 travels along the currently traveling road at a preset vehicle speed V or a vehicle speed V for following the front vehicle. After executing S2, the process returns to S1.

When the determination result of S1 is YES, the process proceeds to S3. In S3, it is determined whether the red light 81R is lit. When the light color of the main light 81 recognized by the signal recognition unit 71 is yellow or blue, the determination result in S3 becomes NO. When the determination result in S3 is NO, the process proceeds to S4.

In S4, control is executed according to the color of the lit light. When the lit light is blue, the vehicle is controlled to pass through the target intersection and proceed through the target intersection in the direction toward the destination. When the lit light is yellow, control is executed to stop the vehicle at the target intersection. Note that when the lit light color is yellow, the primary deceleration control (S8) may be executed as in the case where the red light 81R is lit and the arrow light lighting state cannot be recognized. After executing S4, the process returns to S1.

When the determination result of S3 is YES, the process proceeds to S5. In S5, traffic light information of the target traffic light is acquired from the map DB.

The above-described S3 and the following S6 and S7 are conditions (hereinafter referred to as primary control conditions) for determining whether to execute the primary deceleration control (S8). One condition for the primary control condition to be satisfied is that it can be determined that the red light 81R is lit based on the recognition result of the signal recognition unit 71, but it cannot be determined whether the arrow light 82 is lit.

In S6, the target traffic light determines whether the traffic light 80 is equipped with the arrow light 82 for the travel lane in which the vehicle 5 is traveling, based on the traffic light information acquired in S5. The lane in which the vehicle 5 is traveling is acquired from the lane recognition unit 72. When the traffic light information indicates that there is no arrow light 82, the determination result in S6 becomes NO. Further, even in a case where the traffic light information indicates that there is one or more arrow lights 82 at the target traffic light, when the arrow lights 82 are not for the lane in which the vehicle 5 is traveling, the determination result of S6 becomes NO. For example, when the traffic light information indicates that the target traffic light is equipped with only the arrow light 82R, and the vehicle 5 is traveling straight or in a left turn lane, the determination result in S6 becomes NO. When the determination result in S6 is NO, naturally the arrow light 82 for the travel lane in which the vehicle 5 is traveling is not lit. When the determination result in S6 is NO, the primary deceleration control (S8), which will be described later, is not executed.

When the traffic light information acquired in S5 indicates that the target traffic light is the traffic light 80 with the arrow light 82 in the lane in which the vehicle 5 is traveling, the determination result in S6 becomes YES. When the determination result of S6 is YES, the process proceeds to S7.

In S7, it is determined whether the arrow light lighting state has been recognized. The arrow light lighting state means the state in which the arrow light 82 that indicates the travel permission direction has been lit. When the direction indicated by the lit arrow light 82 can be determined by image analysis, the determination result in S7 becomes YES. In addition to this, the lighting state of the arrow light may be recognized based on the fixed position of the lit arrow light 82 and the traffic light information acquired in S5. The position where the arrow light lighting state can be recognized in the latter situation is likely to be farther from the target traffic light than the position where the arrow light lighting state can be recognized in the former situation. For example, the position where the arrow light lighting state can be recognized in the former situation depends on the weather, vehicle speed V, and the like, but as an example, it is a position a little less than 50 meters from the target traffic light. On the other hand, the position where the arrow light lighting state can be recognized in the latter situation is between the position where the arrow light lighting state can be recognized in the former situation and the position where the lighting color of the main light can be recognized.

When the arrow light lighting state cannot be recognized, that is, when it cannot be determined whether the arrow light 82 is lit, the determination result in S7 becomes NO. When the determination result in S7 is NO, the process proceeds to S8.

In S8, the primary deceleration control is executed. The primary deceleration control will be described with reference to FIG. 5. The primary deceleration control is control that decelerates the vehicle from a position further from the stop line 92 than stop deceleration start positions Ps0 and Ps1 at the deceleration rate slower than deceleration caused by the stop deceleration control. In the example shown in FIG. 5, the primary deceleration control starts from the position Pf, and ends at the stop deceleration start position Ps1. Then, the stop deceleration control starts from the stop deceleration start position Ps1.

Figure 5:
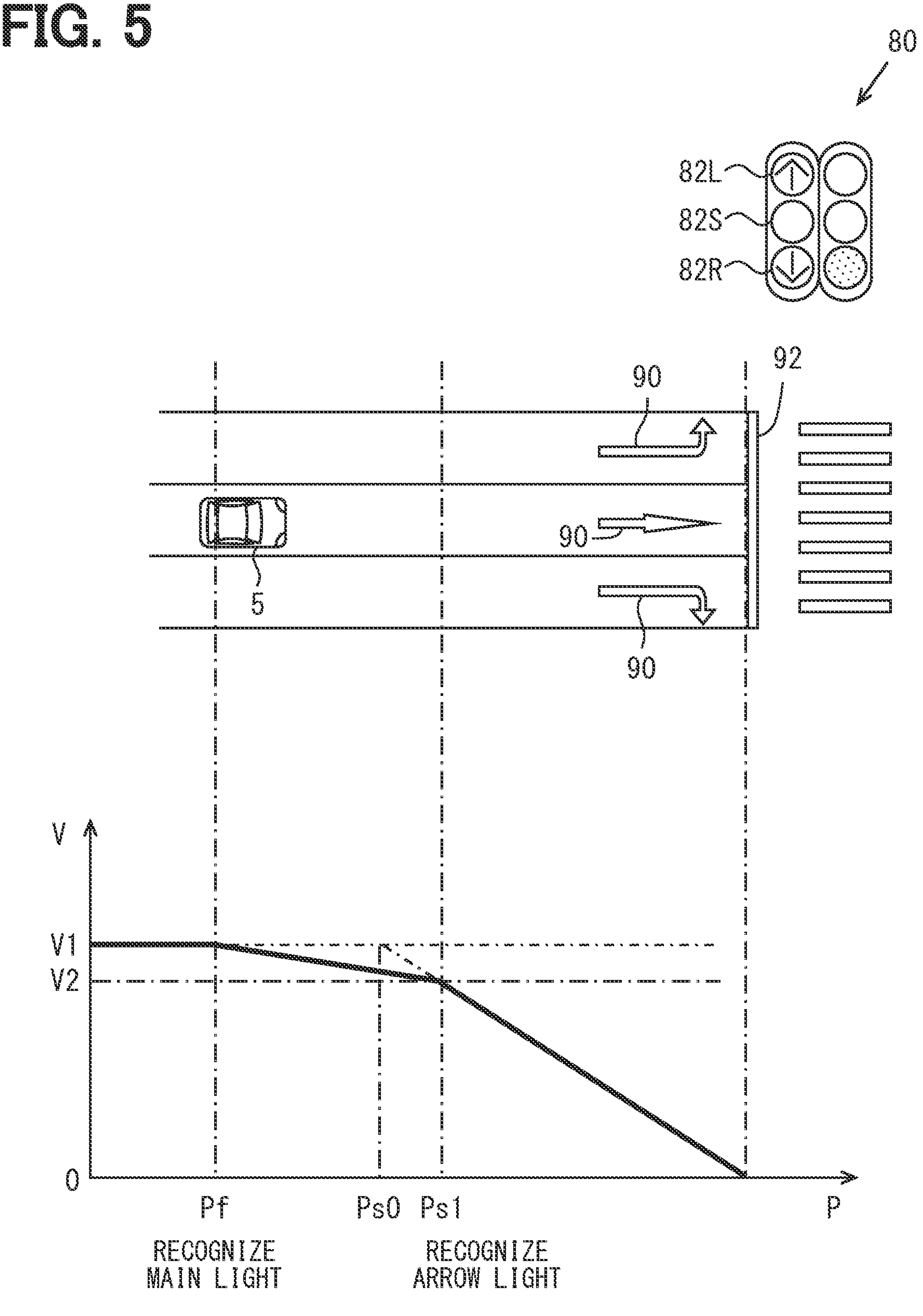
FIG. 5 is a diagram showing speed changes when a vehicle travels in a straight lane and stops at a stop line.

The stop deceleration control is deceleration control that decelerates the vehicle so as to stop at the stop line 92. As shown in FIG. 5, the deceleration rate of the primary deceleration control is slower than the deceleration rate of the stop deceleration control. Note that deceleration means negative acceleration. The stop deceleration start position Ps0 is a deceleration start position when the stop deceleration control without executing the primary deceleration control (hereinafter referred to as stop deceleration control without primary) is executed. The stop deceleration control without primary decelerates the vehicle at a preset deceleration at a stop that does not result in sudden deceleration. The stop deceleration start position Ps0 is the position where deceleration starts in order to decelerate at this deceleration and stop at the stop line 92. The distance for travel during the stop deceleration control can be calculated from the deceleration at the stop time and the vehicle speed V1 before the start of deceleration. Based on this distance and the position of the stop line 92, the stop deceleration start position Ps0 is determined.

On the other hand, the stop deceleration start position Ps1 is the position where the stop deceleration control starts at the execution time of the primary deceleration control. The stop deceleration start position Ps1 is the position at an execution time of S8, and the time difference between when the execution of S8 and execution of S3 is very short. Accordingly, the stop deceleration start position Ps1 is regarded as the position where it is recognized that the red light 81R, which is the main light 81, is lit.

The deceleration in the primary deceleration control may be a slower deceleration than the deceleration in the stop deceleration control. In the example of FIG. 5, the deceleration in the primary deceleration control is such that the vehicle speed becomes the vehicle speed V2 at the position where it is estimated that the arrow light lighting state can be recognized. The vehicle speed V2 is determined based on the distance between the stop line 92 and the position where it is estimated that the arrow light lighting state can be recognized, and the deceleration during the primary stop deceleration control.

Figure 8:
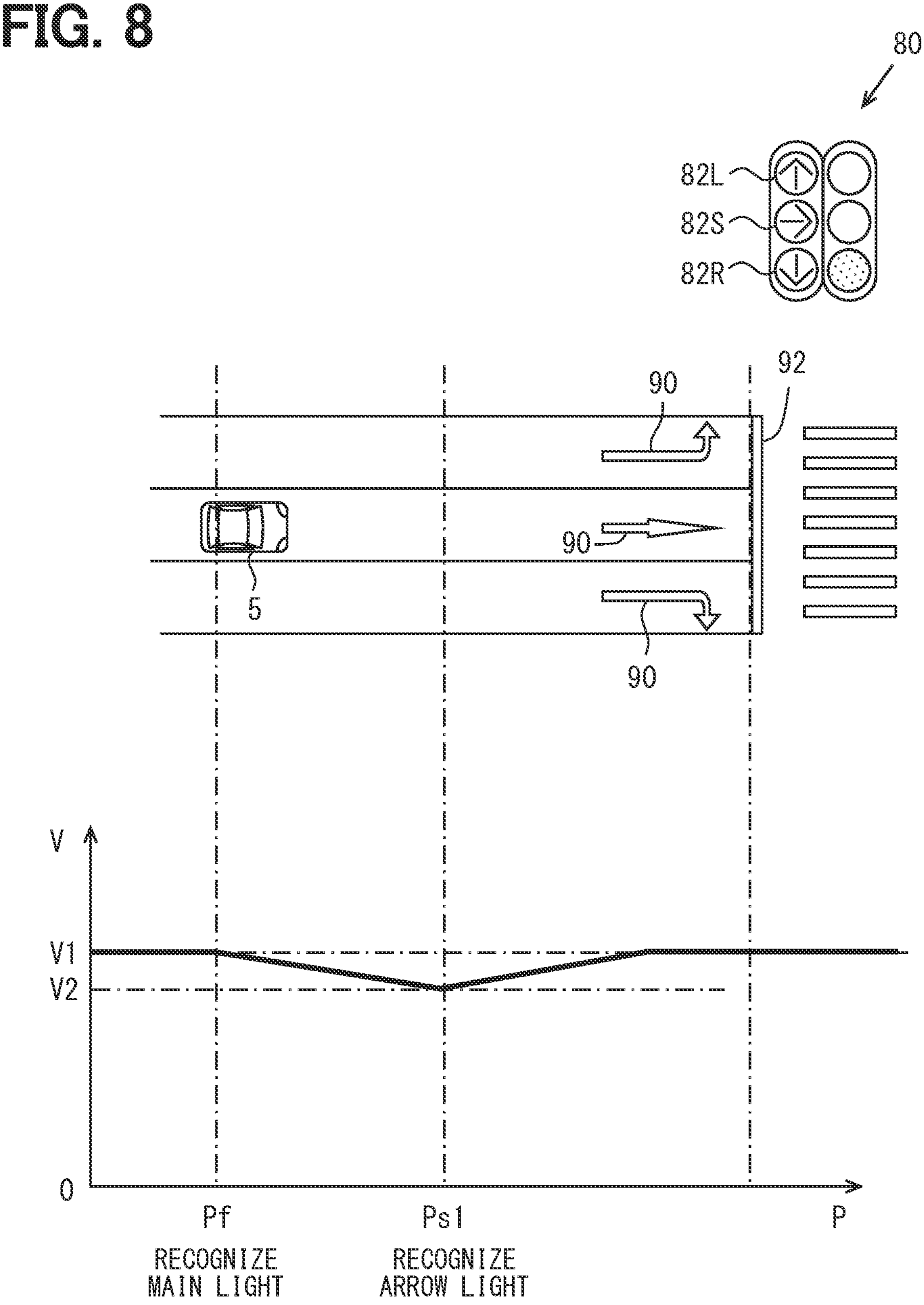
FIG. 8 is a diagram showing speed changes when the vehicle passes straight through an intersection.

Another example of the deceleration in the primary deceleration control is a deceleration that does not give the occupant discomfort by acceleration after deceleration, as in an example of FIG. 8 described later. In other words, it is a small deceleration (for example, −0.05 G) that makes it difficult for the occupant to perceive the deceleration caused by the primary deceleration control and the subsequent acceleration at an acceleration that has the same absolute value as the deceleration caused by the primary deceleration control.

Once the primary deceleration control starts, the process returns to S7 and the primary deceleration control continues until the arrow light lighting state is recognized. When the arrow light lighting state can be recognized, the determination result in S7 becomes YES, and the process proceeds to S9.

In S9, it is determined whether the light is a light that can be passed through.

In an example of FIG. 5, the vehicle 5 is traveling in a straight lane. On the other hand, the arrow lights 82 that are lit are the arrow lights 82L and 82R, and the arrow light 82S is not lit. Accordingly, in the example of FIG. 5, the determination result in S9 is NO.

Figure 6:
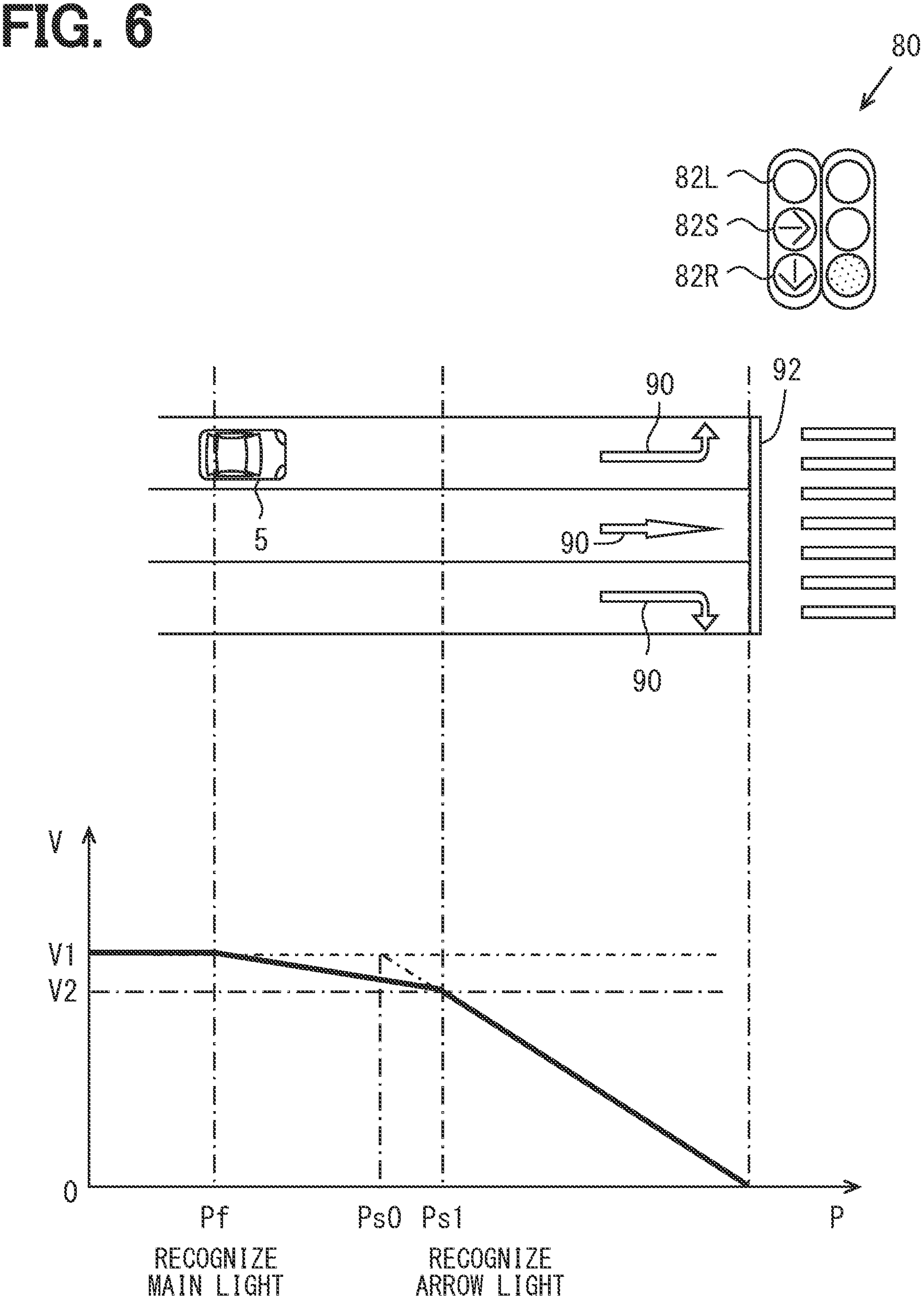
FIG. 6 is a diagram showing speed changes when the vehicle travels in a left turn lane and stops at the stop line.

In an example shown in FIG. 6, the vehicle 5 is traveling in a left turn lane. On the other hand, the arrow lights 82 that are lit are the arrow lights 82S and 82R, and the arrow light 82L is not lit. Accordingly, also in the example of FIG. 6, the determination result in S9 is NO. In an example shown in FIG. 7, the vehicle 5 is traveling in a right turn lane. On the other hand, the arrow lights 82 that are lit are the arrow lights 82L and 82S, and the arrow light 82R is not lit. Accordingly, also in an example of FIG. 7, the determination result in S9 is NO. When the determination result in S9 is NO, the process proceeds to S10.

Figure 7:
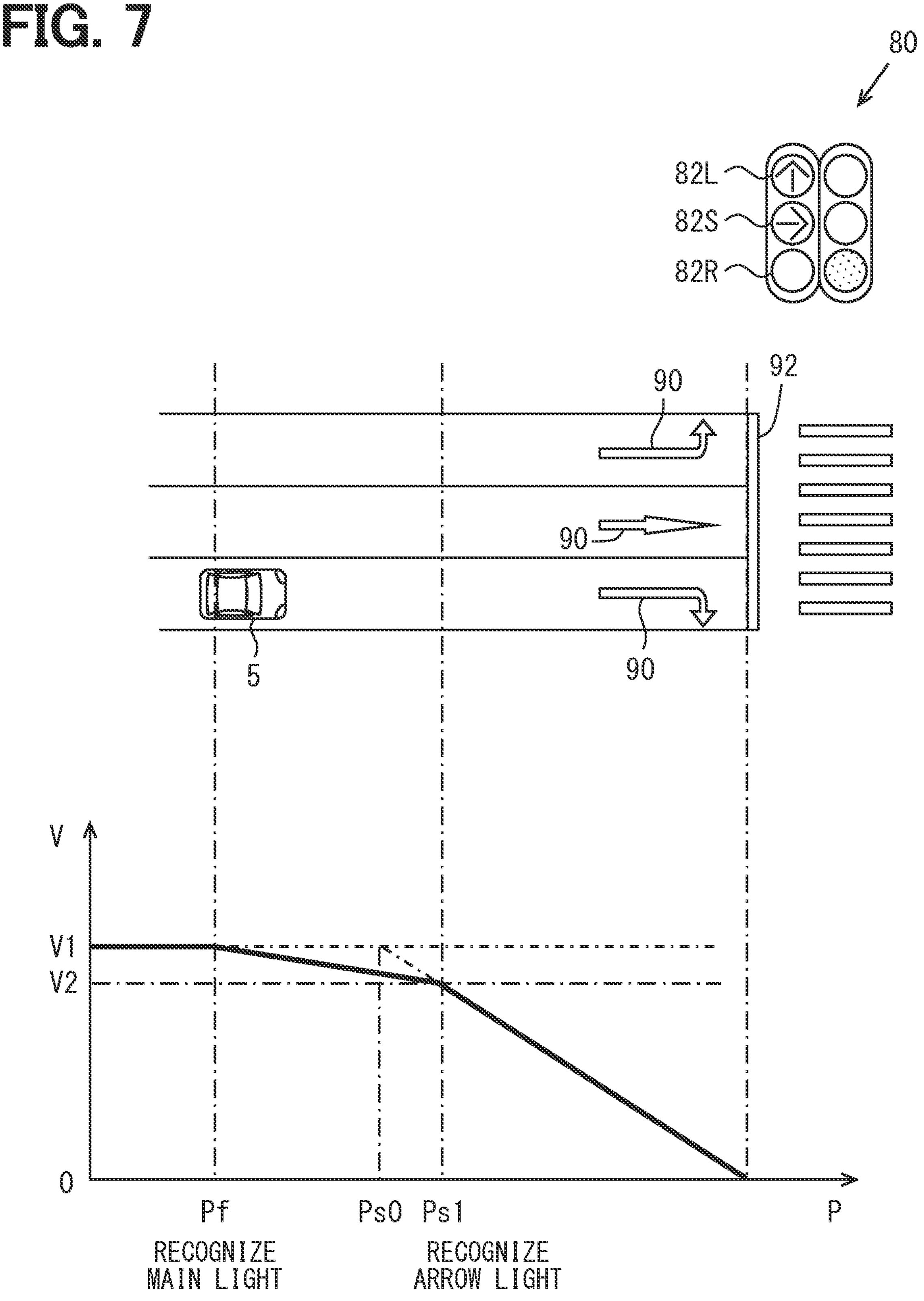
FIG. 7 is a diagram showing speed changes when the vehicle travels in a right turn lane and stops at the stop line.

In S10, the stop deceleration control starts. Thereby, the vehicle 5 starts decreasing the speed at the deceleration to stop at the stop line 92, as shown in FIGS. 5, 6, and 7, and stops at the stop line 92. Note that the decelerations shown in FIGS. 5, 6, and 7 are the same as the deceleration when the stop deceleration control without primary is executed.

Figure 4:
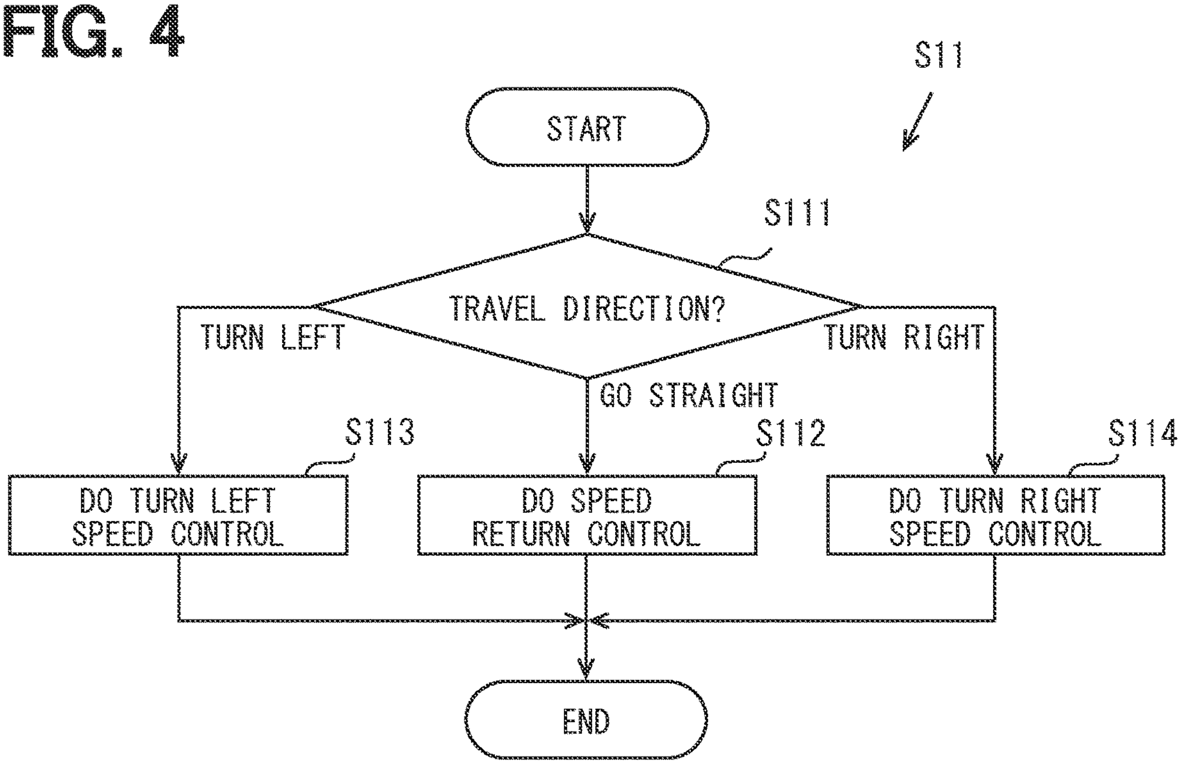
FIG. 4 is a diagram showing a detailed process of S11 in FIG. 3.

When the determination result of S9 is YES, the process proceeds to S11. In S11, passing speed control is executed. The passing speed control is speed control when passing through the target intersection. Details of the process in S11 are shown in FIG. 4. In FIG. 4, in S111, the direction in which the vehicle 5 is traveling at the target intersection is determined. The direction in which the vehicle 5 is traveling at the target intersection can be determined from the direction defined by the lane in which the vehicle 5 is traveling. Further, S111 may be determined based on a destination point set in automated driving control.

When the vehicle 5 is going straight through the target intersection, the process proceeds to S112. In S112, speed return control is executed. The speed return control is control for returning the vehicle speed to the vehicle speed V before starting the primary deceleration control. FIG. 8 shows the speed change of the vehicle 5 when the speed return control is executed. In FIG. 8, the vehicle 5 is traveling in a straight lane, and the arrow light 82S is lit. Accordingly, at the stop deceleration start position Ps1 where the arrow light lighting state is recognized, the speed return control starts instead of the stop deceleration control. In FIG. 8, the acceleration in the speed return control has the same absolute value as the deceleration in the primary deceleration control. However, the absolute value of the acceleration when returning the speed does not necessarily have to be the same as the absolute value of the deceleration in the primary deceleration control.

Figure 9:
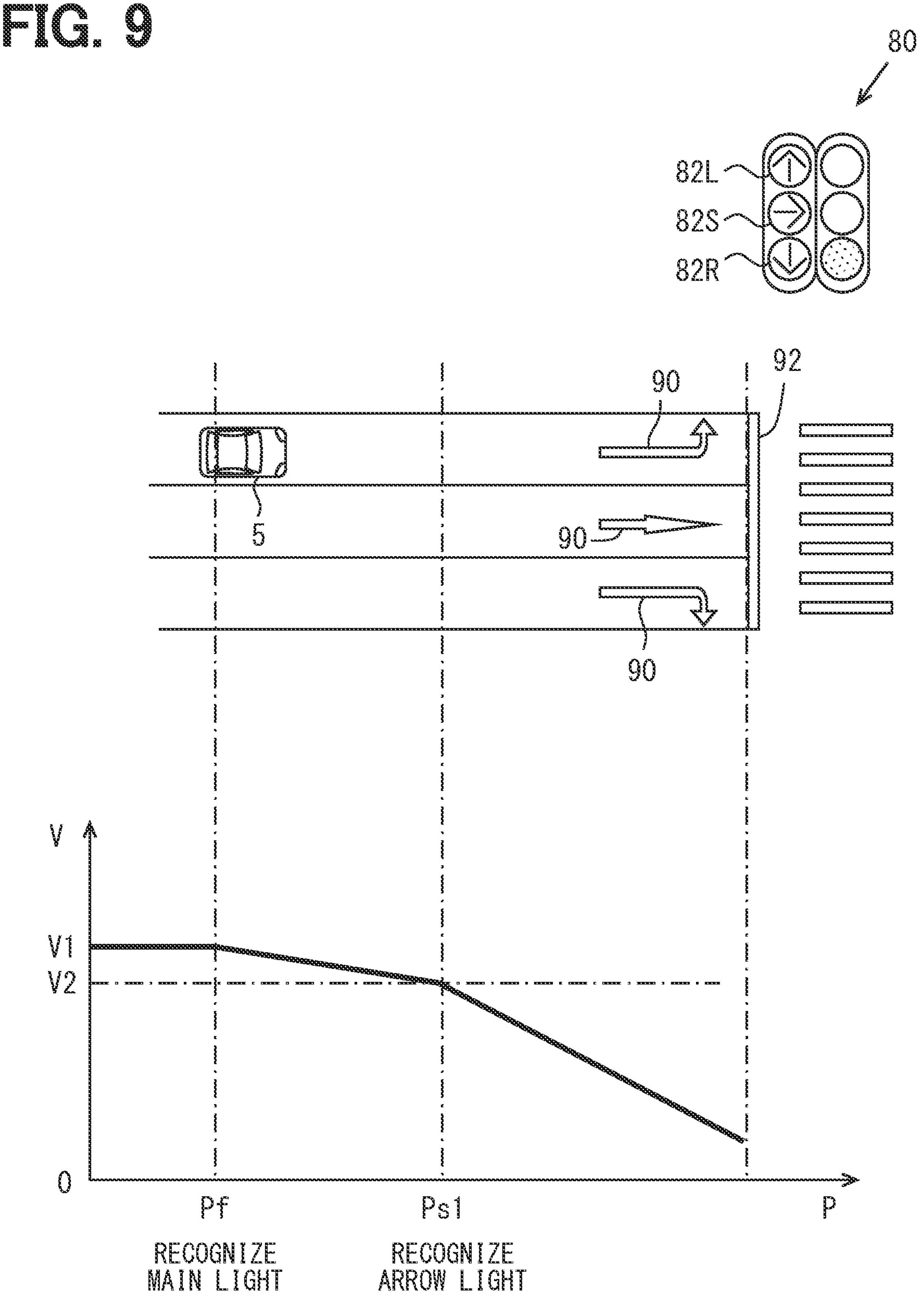
FIG. 9 is a diagram showing speed changes when the vehicle turns left and passes through the intersection.

When it is determined in S111 that the vehicle 5 is going to turn left, the process proceeds to S113. In S113, the left turn speed control is executed. The left turn speed control is a control for decelerating the vehicle when passing the stop line 92 so as to reach a left turn speed at which the vehicle can make a left turn at the target intersection. FIG. 9 shows changes in the speed of the vehicle 5 when the left turn speed control is executed. In FIG. 9, the vehicle 5 is traveling in the left turn lane, and the arrow light 82L is lit. Accordingly, the left turn speed control starts at the stop deceleration start position Ps1 where the arrow light lighting state is recognized. In the left turn speed control, the speed of the vehicle 5 does not reach zero at the stop line 92. Accordingly, the left turn speed control decelerates more gently than the stop deceleration control.

Figure 10:
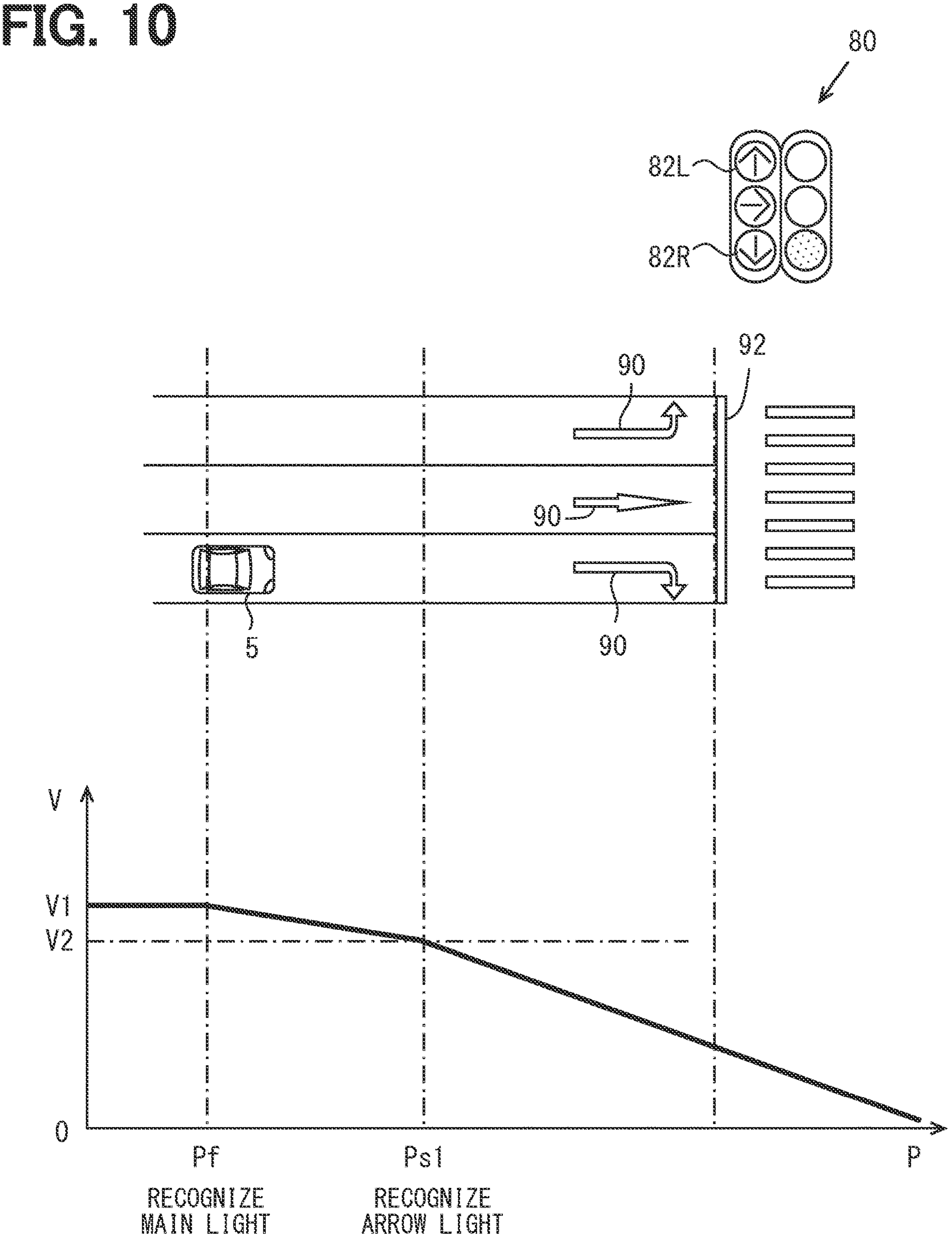
FIG. 10 is a diagram showing speed changes when the vehicle turns right and passes through the intersection.

When it is determined in S111 that the vehicle 5 is going to turn right, the process proceeds to S114. In S114, the right turn speed control is executed. The right turn speed control is speed control in which the vehicle passes through the stop line 92 at a speed that allows the vehicle to stop or slow down within the target intersection. FIG. 10 shows changes in the speed of the vehicle 5 when the right turn speed control is executed. In FIG. 10, the vehicle 5 is traveling in the right turn lane, and the arrow light 82R is lit. Accordingly, the right turn speed control starts at the stop deceleration start position Ps1 where the arrow light lighting state is recognized.

Figure 11:
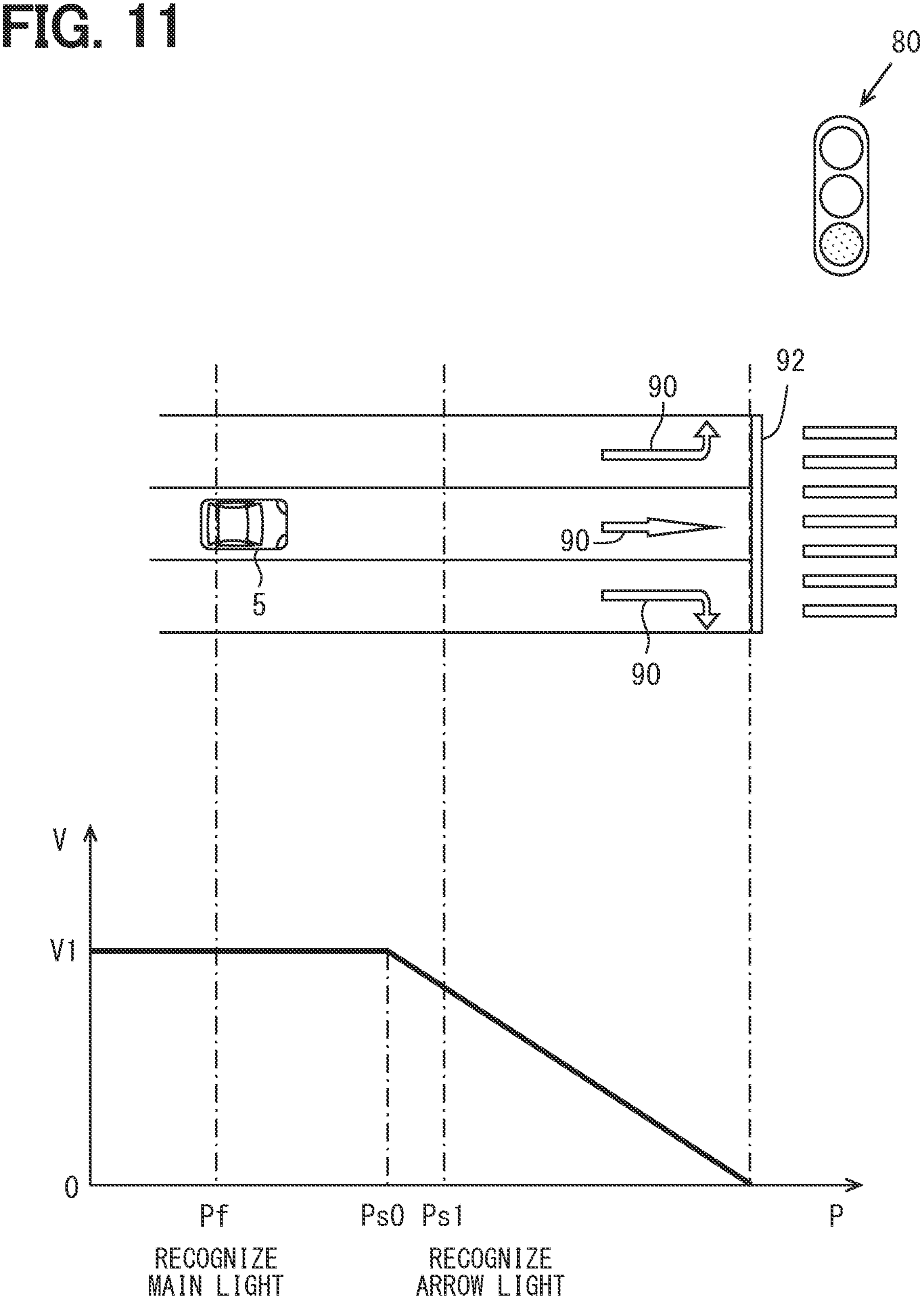
FIG. 11 is a diagram showing speed changes when the vehicle stops at the stop line without executing primary deceleration control.

The following description returns to FIG. 3. When the determination result in S6 is NO, the process proceeds to S12. An example of proceeding to S12 will be described. In FIG. 11, the traffic light 80 does not have the arrow light 82. Accordingly, the determination result in S6 becomes NO and the process proceeds to S12.

Figure 12:
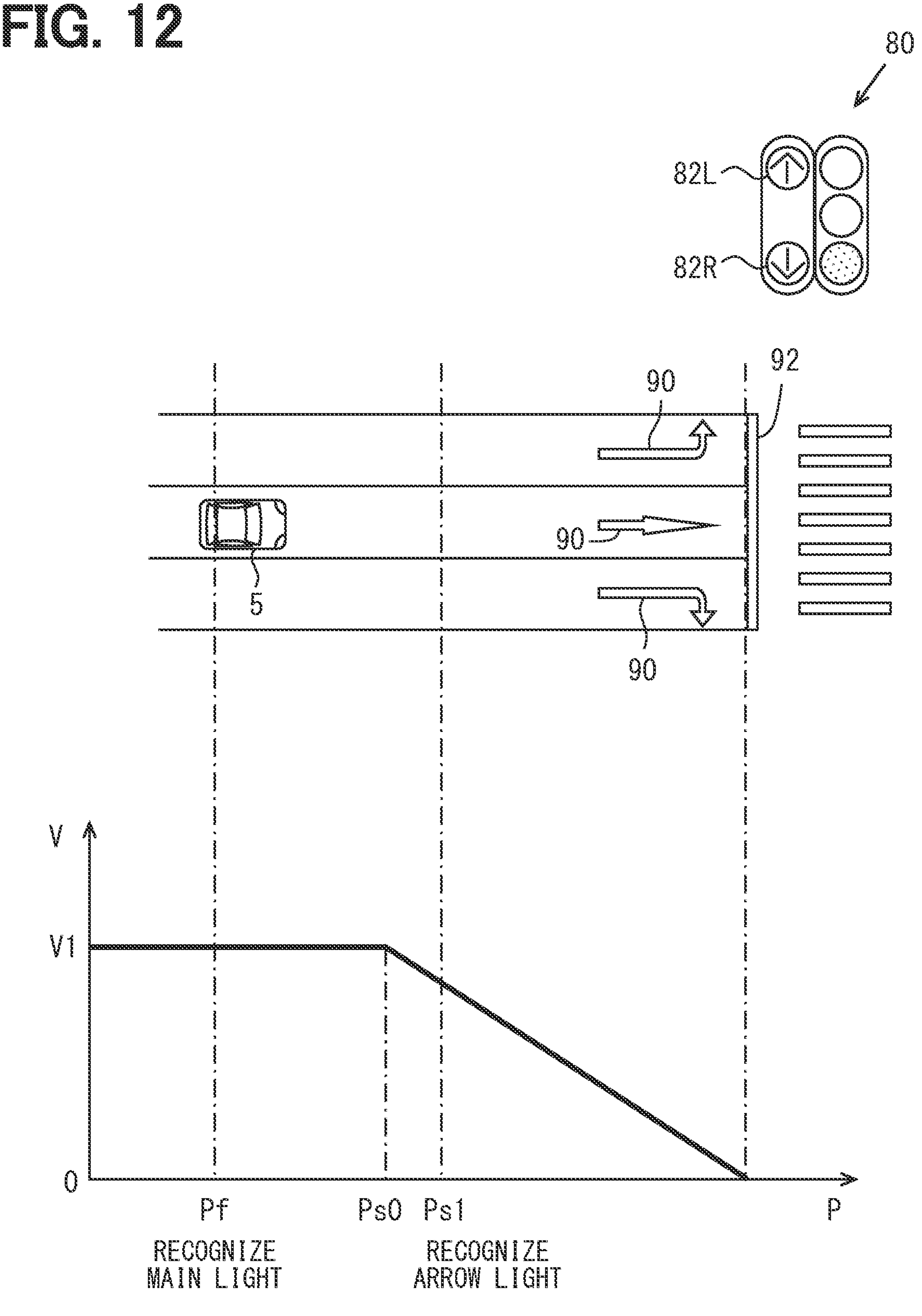
FIG. 12 is a diagram showing speed changes when the vehicle stops at the stop line without executing the primary deceleration control.
Figure 13:
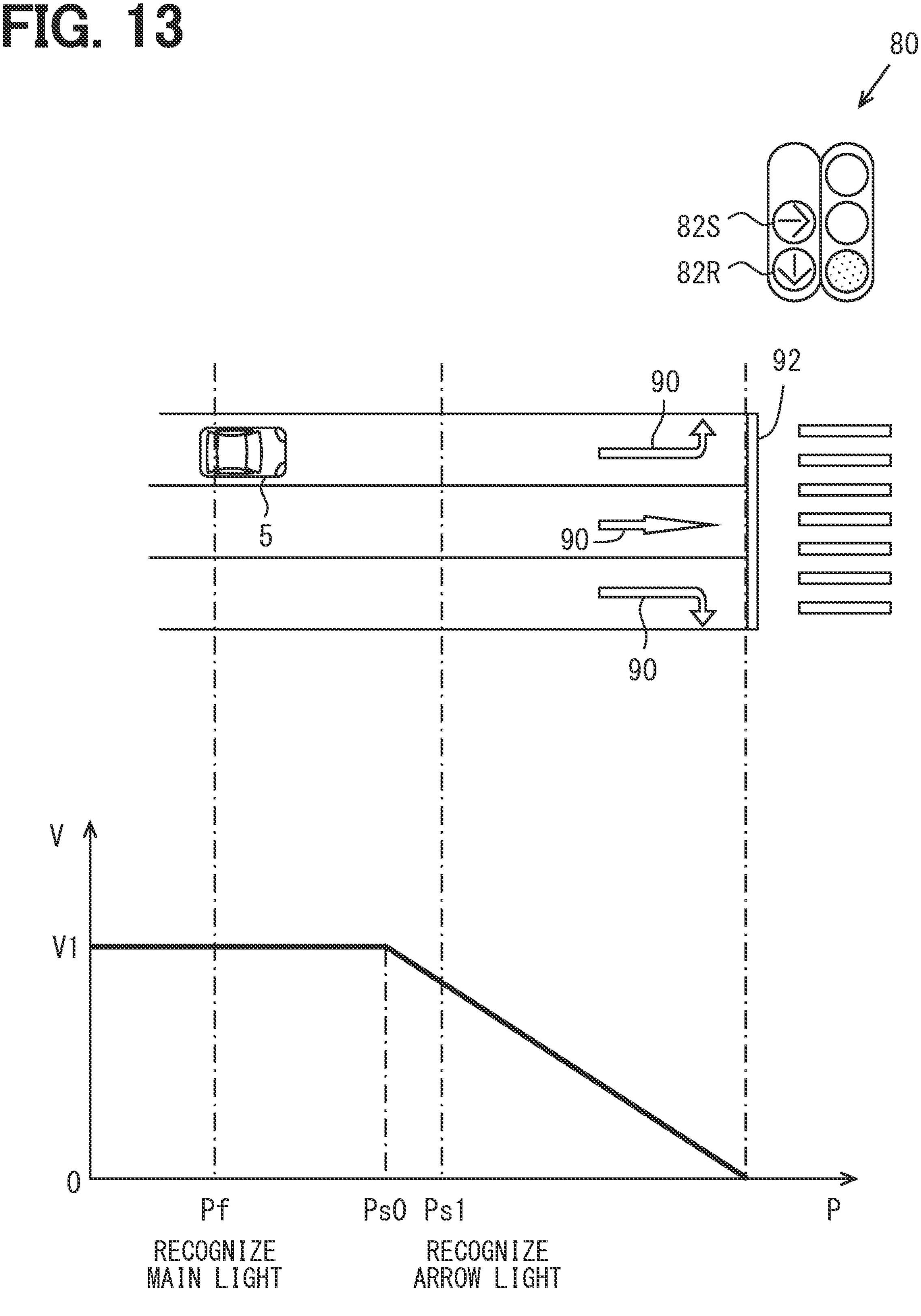
FIG. 13 is a diagram showing speed changes when the vehicle stops at the stop line without executing the primary deceleration control.
Figure 14:
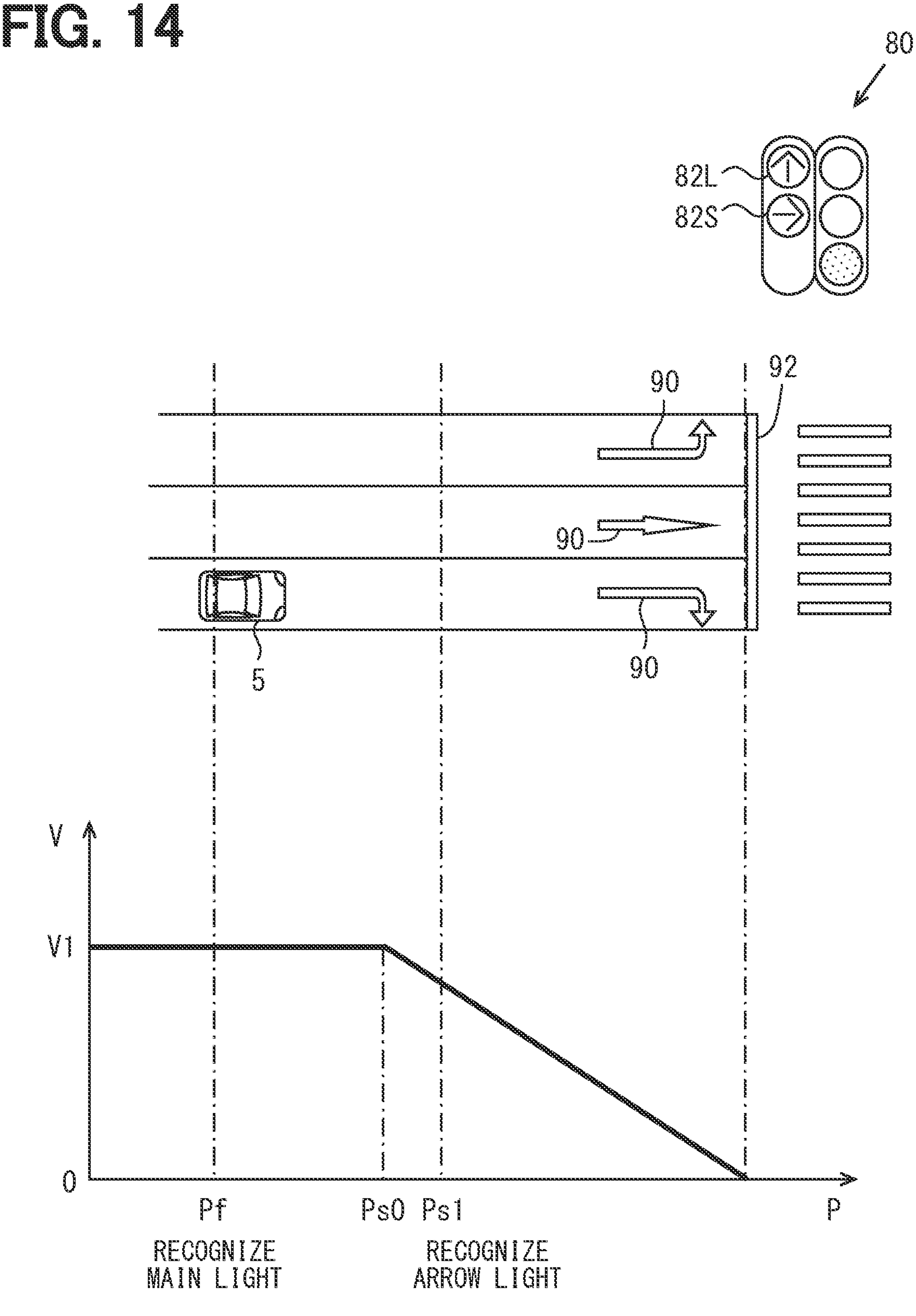
FIG. 14 is a diagram showing speed changes when the vehicle stops at the stop line without executing the primary deceleration control.

FIG. 12, FIG. 13, and FIG. 14 show an example different from that shown in FIG. 11 in which the stop deceleration control without primary is executed. In the example of FIG. 12, the vehicle 5 is traveling in a straight lane. The traffic light 80 includes arrow lights 82L and 82R, but does not include the arrow light 82S. Accordingly, also in the example of FIG. 12, the determination result in S6 becomes NO and the process proceeds to S12. In FIG. 13, the vehicle 5 is traveling in the left turn lane. The traffic light 80 includes the arrow lights 82S and 82R, but does not include the arrow light 82L. Accordingly, also in the example of FIG. 13, the determination result in S6 becomes NO and the process proceeds to S12. In an example of FIG. 14, the vehicle 5 is traveling in the straight lane. The traffic light 80 includes the arrow lights 82L and 82S, but does not include the arrow light 82R. Accordingly, also in the example of FIG. 14, the determination result in S6 becomes NO and the process proceeds to S12.

In S12, the stop deceleration control without primary is executed. FIGS. 11 to 14 show changes in the speed of the vehicle 5 when the stop deceleration control without primary is executed. As described above, the stop deceleration control without primary is a control in which deceleration control starts from the stop deceleration start position Ps0 and stopped at the stop line 92. Since the primary deceleration control is not executed, the stop deceleration start position Ps0 is farther from the stop line 92 than the stop deceleration start position Ps1 where the stop deceleration control starts at the execution time of the primary deceleration control.

Summary of First Embodiment

The vehicle control device 10 of the first embodiment described above starts the primary deceleration control, which is slower deceleration than the stop deceleration control, from a position farther from the stop line 92 than the stop deceleration start positions Ps0 and Ps1 (S8). The primary control condition, which is the condition for starting the primary deceleration control, is satisfied when it can be determined that the red light 81R has been lit (S3: YES), but it cannot be determined whether the arrow light 82 has been lit (S7: NO).

A position where the main light 81 can be recognized is likely to be more distant from the traffic light 80 than a position where the lighting of the arrow light 82 can be recognized. Accordingly, this vehicle control device 10 can often start primary deceleration control earlier than the second assistance control in the comparative example. Therefore, it becomes possible to make the deceleration rate in the primary deceleration control a slower deceleration rate. Accordingly, it is possible to prevent the occupant from feeling uncomfortable.

The signal recognition unit 71 can acquire traffic light information from the map DB. Accordingly, when the signal recognition unit 71 can determine the lighting of the arrow light 82 and the position of the lit arrow light 82 by analyzing the image, the direction of the arrow indicated by the lit arrow light 82 May not be capable of being determined. The signal recognition unit 71 can recognize the travel permission direction indicated by the lit arrow light 82 using the traffic light information. In image analysis, it is likely to be possible to more recognize the lighting of the arrow light 82 at a position from the traffic light 80 as compared with the direction of the arrow indicated by the arrow light 82. Accordingly, the signal recognition unit 71 can be more likely to recognize the traveling permission direction indicated by the arrow light 82 at a position farther from the traffic light 80 than when no traffic light information is used.

When it is determined, based on the map information, that the target traffic light does not have the arrow light 82 for the travel lane in which the vehicle 5 is traveling (S6: NO), the travel controller 73 can determine that the arrow light 82 is not lit. Therefore, the primary control condition is not satisfied. In this way, by using the map information to determine whether the primary control condition is satisfied, it is possible to determine whether the primary control condition is satisfied before the signal recognition unit 71 can recognize the arrow light 82. As a result, the stop deceleration control without primary can start earlier than the stop deceleration control when the primary deceleration control is implemented. By starting the stop deceleration control without primary early, the vehicle 5 can stop at the stop line 92 while making the deceleration rate in the stop deceleration control without primary relatively gentle.

When the determination result in S7 is YES, the travel controller 73 starts the stop deceleration control (S10). Therefore, the stop deceleration start position Ps1 is a position where the signal recognition unit 71 can recognize the presence or absence of the arrow light 82 and the signal permission direction by the arrow light 82. In this way, when it is determined that the vehicle 5 must stop at the stop line 92, the stop deceleration control can start promptly.

When the vehicle 5 goes straight at the target intersection and determines that the target traffic light indicates permission to go straight (S9: YES), the travel controller 73 starts the speed return control after the primary deceleration control (S112). Further, when the vehicle 5 turns left at the target intersection and determines that the target traffic light indicates permission to turn left (S9: YES), the travel controller 73 starts the left turn deceleration control of decelerating the speed to be a left turn possible speed at the intersection after the primary deceleration control (S113). Further, when the vehicle 5 turns right at the target intersection and determines that the target traffic light indicates permission to turn right (S9: YES), the travel controller 73 starts the right turn deceleration control of decelerating the speed so that the vehicle enters the intersection at a right turn possible speed after the primary deceleration control (S114). In this way, after the primary deceleration control, the speed control according to the direction in which the vehicle passes through the target intersection becomes possible.

Second Embodiment

Next, a second embodiment will be described. In the following description of the second embodiment, elements having the same reference symbols as those used so far are the same as the elements having the same reference symbols in the previous embodiment, except when specifically mentioned. When only a part of the configuration is described, the embodiment described above can be applied to other parts of the configuration.

Figure 15:
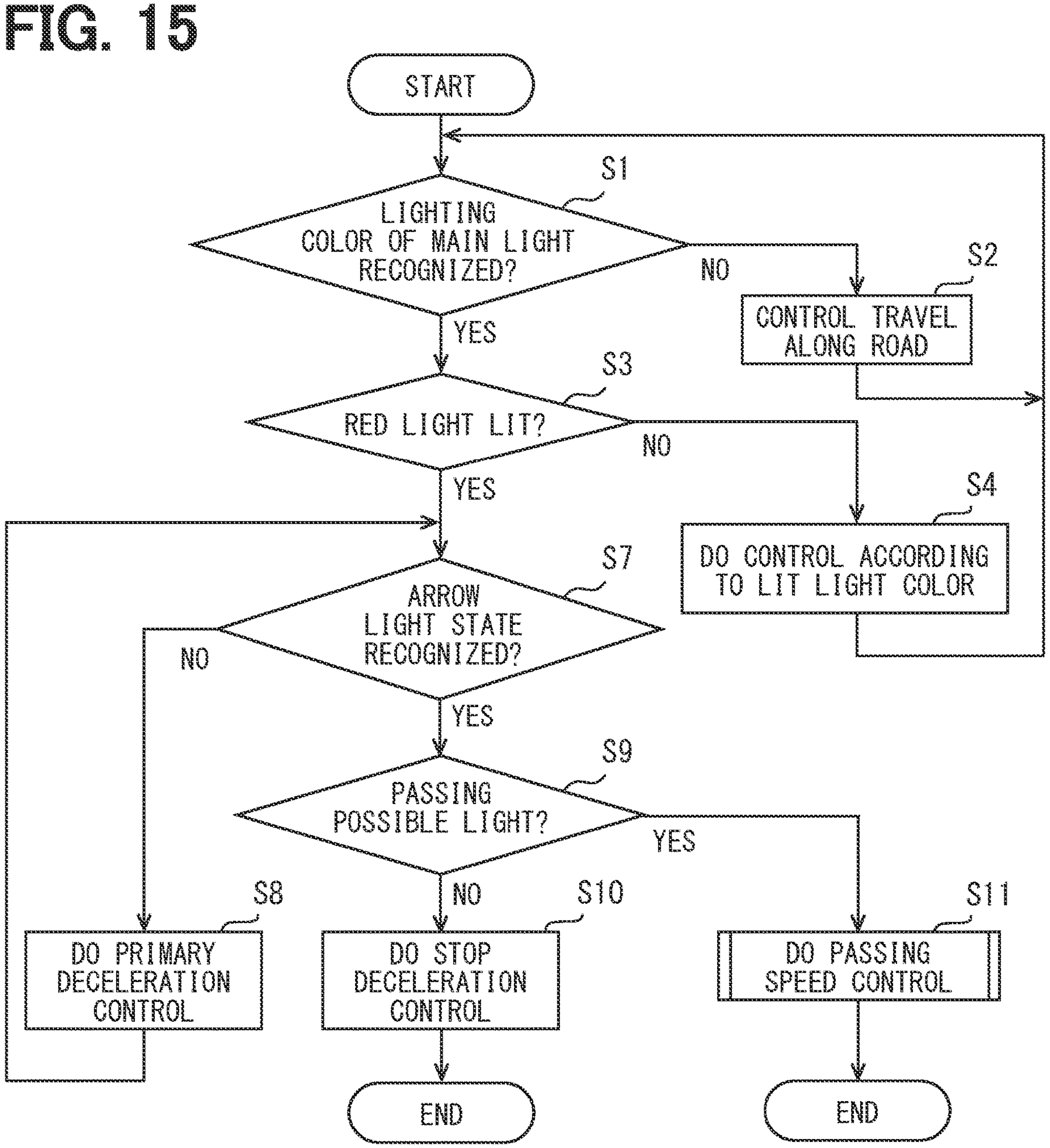
FIG. 15 is a diagram showing a process executed by the travel controller according to a second embodiment.

In the second embodiment, the travel controller 73 does not acquire the traffic light information from the map DB. Accordingly, the map DB does not need to include traffic light information. FIG. 15 is a flowchart showing a process executed by the travel controller 73 in the second embodiment.

In comparison with FIG. 15 and FIG. 3, FIG. 15 does not include S5, S6, and S12 in FIG. 3. This is because, in the second embodiment, the travel controller 73 does not acquire the traffic light information from the map DB.

Therefore, after execution of S3, the determination at S7 is executed next. When the determination in S7 is executed first, the lighting state of the arrow light cannot be recognized in many cases. Therefore, the process proceeds to S8 and the primary deceleration control is executed.

In the second embodiment without using map information, a certain situation may occur. In the situation, it can be determined that the red light 81R is lit, and it can also be determined that the arrow light 82 is lit, but the travel permission direction by the arrow light 82 cannot be determined In a case where it can be determined that the red light 81R is lit, and it can also be determined that the arrow light 82 is lit, when the travel permission direction by the arrow light 82 cannot be determined, the lighting state of the arrow light cannot be recognized. In this case, the determination result in S7 becomes NO, and the primary deceleration control is executed. That is, one of the primary control conditions of the second embodiment is that it can be determined that the red light 81R is lit, and it can also be determined that the arrow light 82 is lit, but the travel permission direction by the arrow light 82 cannot be determined.

Figure 16:
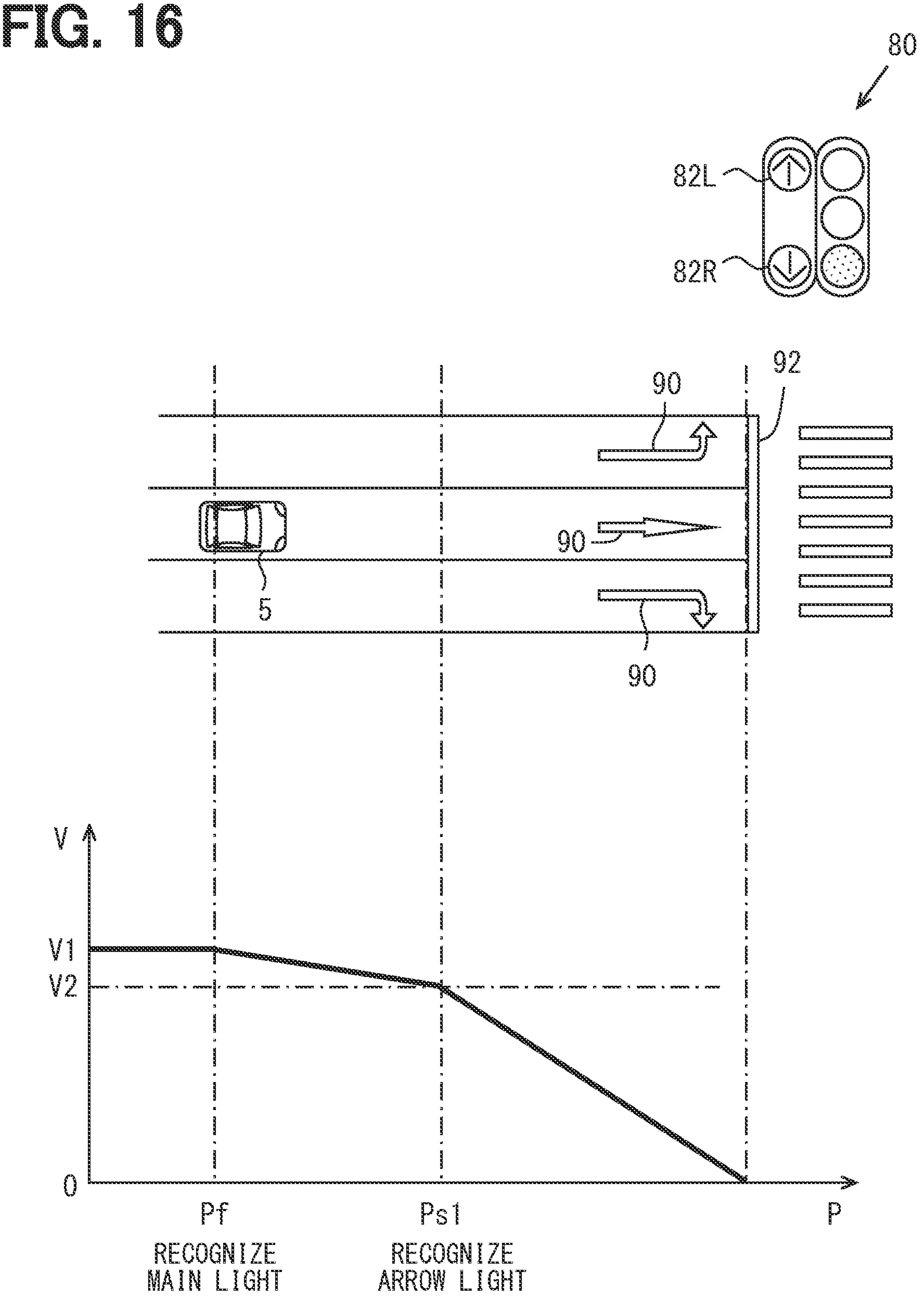
FIG. 16 is a diagram illustrating speed changes of the vehicle according to the second embodiment.

In FIG. 16, the lane in which the vehicle 5 travels and the state of the traffic light 80 are the same as in FIG. 12. However, in the second embodiment, the primary deceleration control starts from the position Pf. Further, in the first embodiment, the stop deceleration control without primary starts from the stop deceleration start position Ps0. However, in the second embodiment, the stop deceleration control without primary is not executed. Then, as shown in FIG. 16, the stop deceleration control starts from the stop deceleration start position Ps1.

In the example of FIG. 16, the traffic light 80 includes arrow lights 82L and 82R. However, according to the second embodiment, even when the traffic light 80 does not include any arrow lights 82, the speed change of the vehicle 5 is the same as that in FIG. 16. Further, according to the second embodiment, even in a case where the traffic light 80 includes the arrow light 82S, when the arrow light 82S is not lit, the speed change of the vehicle 5 will be the same as that in FIG. 16.

One of the primary control conditions of the second embodiment is that it can be determined that the red light 81R is lit, and it can also be determined that the arrow light 82 is lit, but the travel permission direction by the arrow light 82 cannot be determined. Even in this case, as shown in FIG. 16, the primary deceleration control can start from position Pf, as in the first embodiment. Accordingly, it becomes possible to make the deceleration rate in the primary deceleration control a slower deceleration rate.

Although the embodiments of the present disclosure have been described above, the present disclosure is not limited to the above embodiments, and various modified examples described below are also included in the technical scope of the present disclosure. Furthermore, various modifications other than the following can be made without departing from the gist.

First Modification

In the embodiments, the case of driving on the left side has been described. In a case of driving on the right side, the "left" and "right" in the embodiments are interchanged.

Second Modification

While the primary deceleration control is being executed, a sign indicating that the primary deceleration control is being executed may be displayed on a display device located at a position that the driver of the vehicle 5 can recognize. Further, a sign may be displayed to indicate that the stop deceleration control, speed return control, left turn speed control, and right turn speed control are being executed.

Third Modification

The vehicle control ECU 70 and the method thereof according to the present disclosure may be implemented by one or more dedicated computers. Such a described computer may be provided by configuring a processor and a memory programmed to execute one or more functions embodied by a computer program, or by configuring a processor including one or more dedicated hardware logic circuits. Alternatively, the vehicle control ECU 70 and the method thereof according to the present disclosure may be implemented by a dedicated hardware logic circuit. Alternatively, the controller and the method thereof according to the present disclosure may be implemented by one or more dedicated computers configured to include a combination of a processor for executing computer program and at least one hardware logic circuit. The hardware logic circuit may be, for example, ASIC or FPGA.

The storage medium for storing the computer program is not limited to a ROM. The computer program may also be stored in a computer-readable non-transitory tangible storage medium as instructions to be executed by the computer. For example, the computer program may be stored in a flash memory.

The invention claimed is:

1. A vehicle control device for controlling a speed of a vehicle, the device comprising:

at least one of (i) a circuit and (ii) a processor with a memory storing computer program code executable by the processor, the at least one of the circuit and the processor configured to cause the vehicle control device to:

recognize a lighting state of a red light and a lighting state of an arrow light based on an image obtained by a camera that recognizes a periphery environment of the vehicle, the red light and the arrow light each comprising one of a plurality of main lights of a traffic light;

recognize a travel permission direction of an arrow light of the traffic light based on an the image or map data;

execute a stop deceleration control based on recognizing that the red light is lit and recognizing the lighting state of the arrow light; and execute a primary deceleration control based on a primary control condition being satisfied, the primary control condition includes recognizing that the red light is lit and not recognizing the lighting state of the arrow light, wherein the stop deceleration control starts deceleration control at a predetermined deceleration rate to stop at a stop line from a stop deceleration start position, and the primary deceleration control decelerates the vehicle at a deceleration rate slower than a deceleration rate by the stop deceleration control from a position farther from the stop line than the stop deceleration start position, wherein the stop deceleration start position is a position before the stop line in a traveling direction of the vehicle.

2. The vehicle control device according to claim 1, wherein determining that the primary control condition is satisfied comprises recognizing that the red light has been lit based on the recognition result, not recognizing the lighting state of the arrow light, and determining that the traffic light includes the arrow light based on map information.

3. The vehicle control device according to claim 2, wherein the at least one of the circuit and the processor is further configured to cause the vehicle control device to recognize a travel permission direction indicated by the arrow light that has been lit, based on a position of the lit arrow light and the map information, based on, by analyzing the image, recognizing that the arrow light has been lit, determining the position of the lit arrow light, not recognizing an arrow direction indicated by the lit arrow light, and the map information including a relationship between the position of the arrow light and the travel permission direction.

4. The vehicle control device according to claim 1, wherein the at least one of the circuit and the processor is further configured to cause the vehicle control device to determining that the arrow light has not been lit and the primary control condition is not satisfied, when determining that the red light has been lit based on the recognition result, does not determine whether the arrow light has been lit, determines that the traffic light does not include the arrow light for a travel lane in which the vehicle is traveling based on map information.

5. The vehicle control device according to claim 1, wherein determining that the primary control condition is satisfied comprises recognizing that the red light has been lit, recognizing that the arrow light has been lit, and not recognizing a travel permission direction indicated by the arrow light.

6. The vehicle control device according to claim 1, wherein the stop deceleration start position is a position in which a presence or absence of the arrow light is recognized and the travel permission direction indicated by the arrow light is recognized.

7. The vehicle control device according to claim 1, wherein the at least one of the circuit and the processor is further configured to cause the vehicle control device to start speed return control that returns the speed to a speed before start of the primary deceleration control, the speed return control is started based on recognizing that the vehicle goes straight at an intersection with the traffic light and recognizing that the traffic light has indicated permission to go straight after the primary deceleration control.

8. The vehicle control device according to claim 1, wherein the at least one of the circuit and the processor is further configured to cause the vehicle control device to start left turn deceleration control that decelerates the speed to a left turn possible speed at an intersection with the traffic light, the left turn deceleration control is started based on recognizing that the vehicle turns left at the intersection and the traffic light has indicated permission to turn left after the primary deceleration control.

9. The vehicle control device according to claim 1, wherein the at least one of the circuit and the processor is further configured to cause the vehicle control device to start right turn deceleration control that decelerates the speed to enter an intersection with the traffic light at a right turn possible speed, the right turn deceleration control is started based on recognizing that the vehicle turns right at the intersection and the traffic light has indicated permission to turn right after the primary deceleration control.

10. A vehicle control method for controlling a speed of a vehicle, the method comprising:

recognizing a lighting state of a red light and a lighting state of an arrow light based on an image obtained by a camera that recognizes a periphery environment of the vehicle, the red light and the arrow light each comprising one of a plurality of main lights of a traffic light;

recognizing a travel permission direction of an arrow light of the traffic light based on the image or map data; and executing:

a stop deceleration control based on recognizing that the red light is lit and recognizing the lighting state of the arrow light; and primary deceleration control based on a primary control condition being satisfied, the primary control condition includes recognizing that the red light is lit and not recognizing the lighting state of the arrow light, wherein the stop deceleration control starts deceleration control at a predetermined deceleration rate to stop at a stop line from a stop deceleration start position, and the primary deceleration control decelerates the vehicle at a deceleration rate slower than a deceleration rate by the stop deceleration control from a position farther from the stop line than the stop deceleration start position, wherein the stop deceleration start position is a position before the stop line in a traveling direction of the vehicle.

* * * * *